(12) United States Patent
Kitsunai et al.

(10) Patent No.: US 10,019,326 B2
(45) Date of Patent: Jul. 10, 2018

(54) MEMORY SYSTEM

(71) Applicant: Toshiba Memory Corporation, Minato-ku, Tokyo (JP)

(72) Inventors: Kazuya Kitsunai, Fujisawa Kanagawa (JP); Akira Shimizu, Toshima Tokyo (JP); Yoshihisa Kojima, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 120 days.

(21) Appl. No.: 15/068,893

(22) Filed: Mar. 14, 2016

(65) Prior Publication Data

US 2017/0017555 A1 Jan. 19, 2017

Related U.S. Application Data

(60) Provisional application No. 62/192,881, filed on Jul. 15, 2015.

(51) Int. Cl.
*G06F 11/00* (2006.01)
*G06F 11/14* (2006.01)
(Continued)

(52) U.S. Cl.
CPC ...... *G06F 11/1471* (2013.01); *G06F 12/0246* (2013.01); *G06F 12/0253* (2013.01);
(Continued)

(58) Field of Classification Search
CPC ............ G06F 11/1471; G06F 11/141; G06F 11/1441; G06F 11/1666; G06F 11/1695;
(Continued)

(56) References Cited

U.S. PATENT DOCUMENTS 6,324,116 B1 * 11/2001 Noh .................. G06F 12/0893
365/220
8,151,060 B2   4/2012 Mizushima
(Continued)

FOREIGN PATENT DOCUMENTS

| JP | 2008-159013 A | 7/2008 |
| JP | 2010-157141 A | 7/2010 |
| JP | 2012-141944 A | 7/2012 |

*Primary Examiner* — Bryce P Bonzo
*Assistant Examiner* — Anthony J Amoroso
(74) *Attorney, Agent, or Firm* — White & Case LLP

(57) ABSTRACT

According to one embodiment, a memory system is connectable to a host. The memory system includes a first memory, a second memory, and a controller. The first memory stores translation information associating a logical address and a physical address. The second memory stores location information associating the logical address and a location of the translation information. The controller updates the translation information and the location information. After returning from a power supply interruption, the controller starts, at different timing, recovery of first location information and recovery of second location information. The first location information is a part of the location information. The second location information is a part of the location information different from the first location information. The controller executes processing different from recovery of the location information between the recovery of the first location information and the recovery of the second location information.

18 Claims, 15 Drawing Sheets

(51) Int. Cl.
*G06F 12/1009* (2016.01)
*G06F 12/02* (2006.01)
(52) U.S. Cl.
CPC .... *G06F 12/1009* (2013.01); *G06F 2201/805* (2013.01); *G06F 2201/84* (2013.01); *G06F 2212/1032* (2013.01); *G06F 2212/2022* (2013.01); *G06F 2212/7201* (2013.01); *G06F 2212/7205* (2013.01)
(58) Field of Classification Search
CPC ............ G06F 12/0246; G06F 12/0253; G06F 12/1009; G06F 12/02; G06F 12/023; G06F 12/0238; G06F 12/0284; G06F 12/0292; G06F 12/10; G06F 12/1027; G06F 12/1036; G06F 12/1045; G06F 12/1072; G06F 12/109; G06F 2201/805; G06F 2201/84; G06F 2212/1032; G06F 2212/2022; G06F 2212/7201; G06F 2212/7205; G06F 9/5016
See application file for complete search history.

(56) References Cited

U.S. PATENT DOCUMENTS

| | | |
|---|---|---|
| 8,352,706 B2 | 1/2013 | Yano et al. |
| 2008/0109798 A1* | 5/2008 | Gavens .................. G06F 8/65 717/168 |
| 2009/0193193 A1* | 7/2009 | Kern .................. G06F 11/1441 711/128 |
| 2012/0159051 A1 | 6/2012 | Hida et al. |

* cited by examiner

MEMORY SYSTEM

CROSS-REFERENCE TO RELATED APPLICATIONS

This application is based upon and claims the benefit of priority from U.S. Provisional Application No. 62/192,881, filed on Jul. 15, 2015; the entire contents of which are incorporated herein by reference.

FIELD

Embodiments described herein relate generally to a memory system.

BACKGROUND

In the past, a memory system having a nonvolatile memory such as a flash memory as a storage memory is known. The memory system stores one or more pieces of translation information therein. Each piece of translation information indicates a correspondence relationship between a logical address and a physical address. The logical address is logical address information indicating a location in a logical address space provided by the memory system to a host. The physical address is address information indicating a physical location in the nonvolatile memory. More specifically, each piece of translation information maps a physical location in the nonvolatile memory to a logical address. The memory system updates corresponding translation information in accordance with writing of data for which a location is designated by a logical address into a nonvolatile memory.

The memory system includes not only the storage memory but also a volatile memory. The memory system, in such configuration, stores at least each piece of translation information into a volatile memory, and uses each piece of translation information stored in the volatile memory. The memory system writes the each piece of translation information updated in the volatile memory into the nonvolatile memory. A plurality of pieces of location information, each indicating a location to which each piece of translation information are stored, are stored in the volatile memory. The memory system writes the plurality of pieces of location information stored in the volatile memory also into the nonvolatile memory. After returning from a power supply interruption, the memory system recovers each piece of the location information into the volatile memory based on the information stored in the nonvolatile memory.

DETAILED DESCRIPTION

According to the present embodiment, a memory system is connectable to a host. The memory system includes a first memory, a second memory, and a controller. The first memory is a nonvolatile memory. The first memory stores translation information associating a logical address and a physical address. The logical address indicates a location in an address space provided to the host. The physical address indicates a location in the first memory. The second memory is a volatile memory. The second memory stores location information associating the logical address and a location where the translation information is stored in the first memory. The controller updates the translation information and the location information. After returning from a power supply interruption, the controller starts, at different timing, recovery of first location information and recovery of second location information. The first location information is a part of the location information. The second location information is a part of the location information and different from the first location information. The controller executes processing different from recovery of the location information between the recovery of the first location information and the recovery of the second location information.

Exemplary embodiments of a memory system will be explained below in detail with reference to the accompanying drawings. The present invention is not limited to the following embodiments.

First Embodiment

Figure 1:
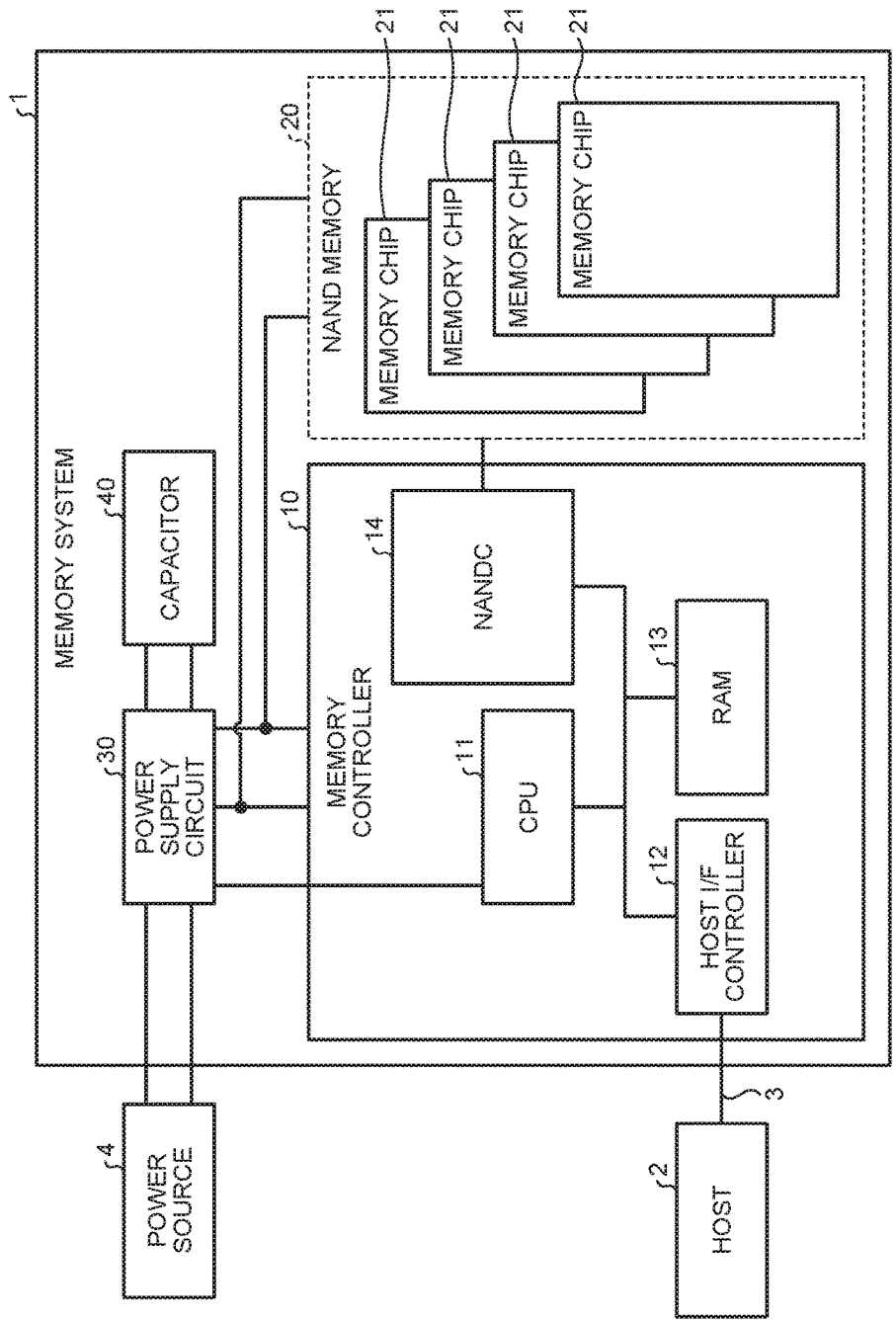
FIG. 1 is a figure illustrating an example of a configuration of a memory system according to a first embodiment.

FIG. 1 is a figure illustrating an example of a configuration of a memory system according to the first embodiment. A memory system 1 is connected to a host 2 via a communication path 3. The host 2 is a processor or a peripheral device of a computer. The computer includes, for example, a personal computer, a portable computer, a server device (a server system), or a portable communication device. The memory system 1 functions as an external storage device for the host 2. Any given standard may be employed as an interface standard of the communication path 3. The host 2 can issue an access request (a write request, a read request) to the memory system 1. The access request includes logical address information (logical address). The logical address indicates a location (address) in a logical address space provided by the memory system 1 to the host 2.

The memory system 1 includes a memory controller 10, a NAND-type flash memory (NAND memory) 20, a power supply circuit 30, and a capacitor 40. The NAND memory 20 is used as a storage memory. The type of a memory used as the storage memory is not restricted to only the NAND-type flash memory. For example, a NOR-type flash memory, a resistive random access memory (ReRAM), a magnetoresistive random access memory (MRAM), or the like can be employed as the storage memory. The storage memory is a nonvolatile memory.

The power supply circuit 30 provides the electric power provided from the external power source 4 to the memory controller 10 and the NAND memory 20 upon converting the electric power or without converting the electric power. The power source 4 may be incorporated into the host 2, or may be installed outside of the host 2. The memory controller 10 and the NAND memory 20 are operated by using the electric power provided from the power supply circuit 30. The power supply circuit 30 charges the capacitor 40 by using the electric power provided from the external power source 4. Any given type of battery can be employed as the capacitor 40 as long as it is a battery rechargeable of a charge (an electron or an electron hole). Examples of capacitors 40 include an electrolytic capacitor or an electrical double layer capacitor.

The memory system 1 receives a previous notice of power off from the host 2 before the power off. When the memory controller 10 (more specifically, a CPU 11 explained later) receives a previous notice of power off, the memory controller 10 activates a power off sequence (a normal power off sequence). In a case where the power supply is interrupted without any previous notice of power off, the power supply circuit 30 detects a stop of the power supply. For example, power supply circuit 30 monitors the voltage of the electric power provided from the power source 4, and when the monitored value of the voltage becomes less than a predetermined threshold value, the stop of the power supply is detected. The power supply circuit 30 notifies the CPU 11 that the power supply has stopped. The CPU 11 activates an emergency power off sequence in response to reception of a notification of stop of the power supply. The capacitor 40 provides an electric power for achieving the emergency power off sequence. The power supply circuit 30 switches the supply source of the electric power from the power source 4 to the capacitor 40 in accordance with the stop of the power supply. The normal power off sequence and the emergency power off sequence include processing of non-volatilization. The non-volatilization indicates processing for saving predetermined kind of information in the volatile memory (the random access memory (RAM) 13 in this case) into the nonvolatile memory (the NAND memory 20 in this case). Any method may be employed as the method of saving. In the non-volatilization, the predetermined kind of information in the volatile memory may be copied to the nonvolatile memory as it is, or the predetermined kind of information in the volatile memory may be converted and the converted predetermined kind of information may be stored into the nonvolatile memory. The normal power off sequence and the emergency power off sequence may be different from each other or may be the same. Hereinafter, regardless of presence/absence of a previous notice of power off, stop of the power supply from the power source 4 will be referred to as "power supply interruption".

When the power supply from the power source 4 is started (in other words, when the memory system 1 returns from the power supply interruption), the power supply circuit 30 detects the start of the power supply. The power supply circuit 30 notifies the CPU 11 that the power supply has started. The CPU 11 activates the power on sequence in accordance with the reception of the notification of the start of the power supply. The power on sequence indicates processing for causing the state of the memory system 1 to transit to a state in which an access request from the host 2 can be processed. The power on sequence includes a reset and the like of each element in the memory controller 10 (a host I/F controller 12, a RAM 13, or a NANDC 14 explained later).

The NAND memory 20 is composed of one or more memory chips 21. In this case, the NAND memory 20 includes four memory chips 21. Each memory chip 21 includes a plurality of blocks. The block is a minimum unit of erasing. Each block includes a plurality of pages. The page is the minimum unit for read and program.

The memory controller 10 includes the CPU (Central Processing Unit) 11, the host interface (Host I/F) controller 12, the RAM 13, and the NAND controller (NANDC) 14. The CPU 11, the Host I/F 12, the RAM 13, and the NANDC 14 are connected with each other via a bus. RAM 13 may be implemented outside of the memory controller 10.

The Host I/F controller 12 executes control of the communication path 3. The Host I/F controller 12 receives various kinds of requests from the host 2. The Host I/F controller 12 executes data transfer between the host 2 and the RAM 13. The NANDC 14 executes data transfer between the RAM 13 and the NAND memory 20. The CPU 11 controls the entire memory controller 10 on the basis of the firmware program.

The firmware program is stored in, for example, the NAND memory 20. The firmware program is loaded to the RAM 13 during booting. The CPU 11 is a circuit for realizing various kinds of functions on the basis of the firmware program loaded to the RAM 13. Various kinds of functions realized by the CPU 11 will be explained later.

Figure 2:
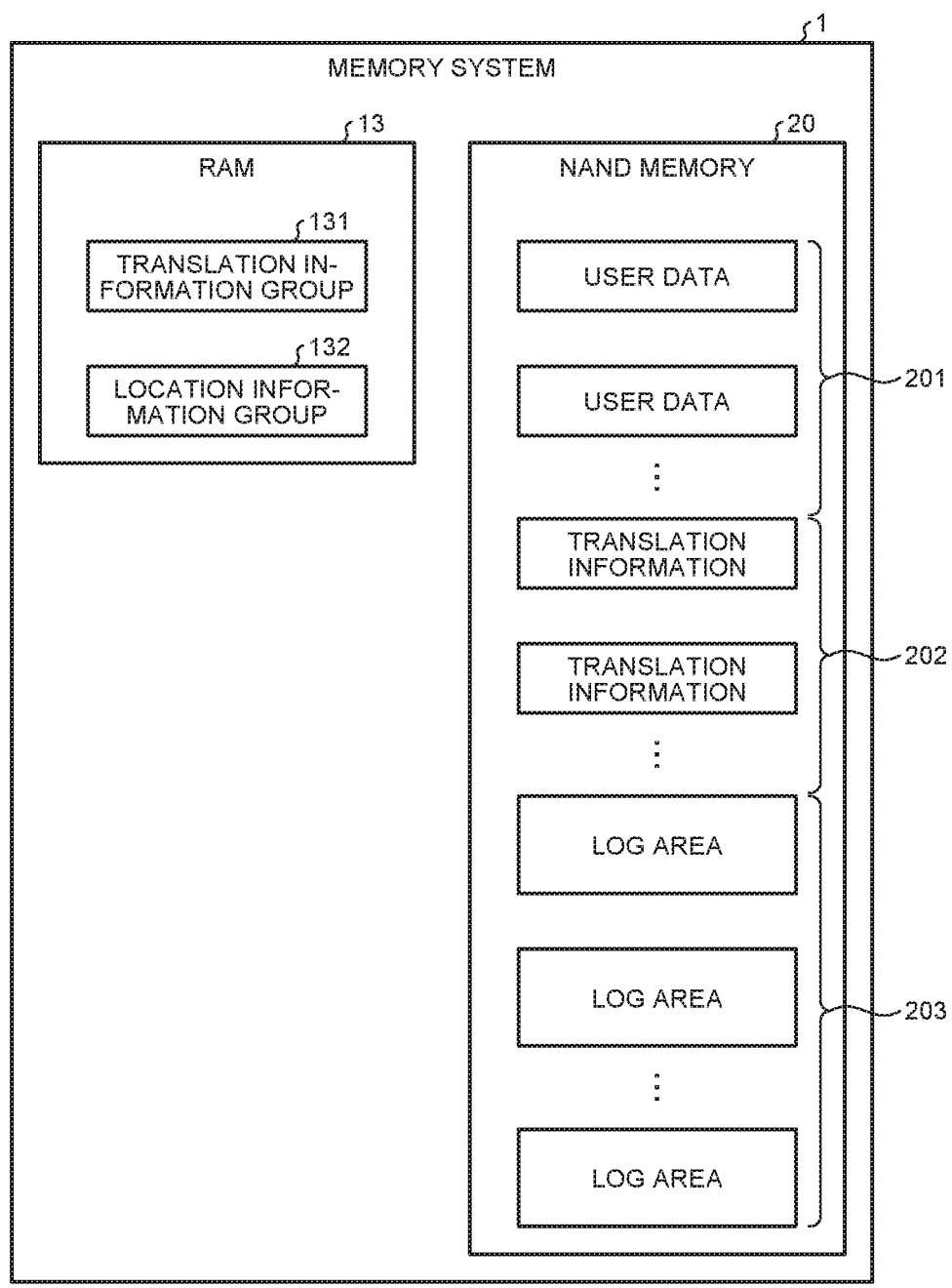
FIG. 2 is a figure illustrating an example of a configuration of a memory in the memory system according to a first embodiment.

FIG. 2 is a figure illustrating an example of a configuration of a memory in the memory system 1. The RAM 13 stores a translation information group 131 and a location information group 132. The NAND memory 20 stores one or more pieces of translation information 202 and one or more pieces of user data 201. Each piece of user data 201 is data sent together with a write request from the host 2 or written by garbage collection.

Figure 3:
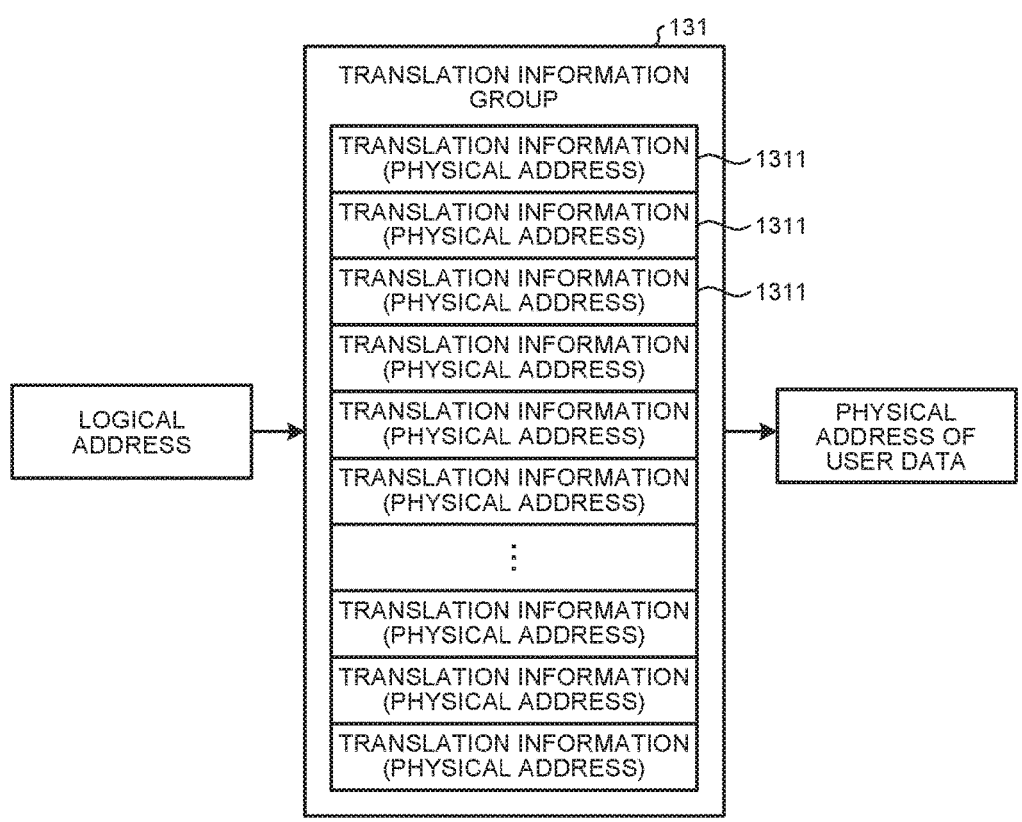
FIG. 3 is a figure illustrating an example of a data structure of a translation information group according to the first embodiment.

FIG. 3 is a figure illustrating an example of a data structure of the translation information group 131. The translation information group 131 includes a plurality of pieces of translation information 1311. In each piece of translation information 1311, a physical address is written. The pieces of translation information 1311 are desired to be arranged in the order of the logical address. More specifically, the translation information group 131 has a structure of a table in which a logical address is provided as an index, and the physical address indicating the storage location of the user data 201 is provided as a data item. Each piece of translation information 1311 corresponds to a data item of the table. The CPU 11 searches the translation information group 131 by using a logical address as a search key, so that the CPU 11 can obtain the physical address indicating the storage location in the NAND memory 20 for the user data 201 sent from the host 2 together with the location designation based on the logical address.

In response to writing of single user data 201 to the NAND memory 20, the corresponding translation information 1311 is updated. A physical address indicating the location of the write destination is recorded in an overwriting manner to the translation information 1311 corresponding to the logical address designating the location of the user data 201 of the write target to be written to the NAND memory 20.

Non-volatilization of each piece of translation information. 1311 is executed in order to prepare against the loss of the translation information group 131 from the RAM 13 upon the power supply interruption. More specifically, each piece of translation information 1311 is saved to the NAND memory 20. In this case, for example, it is supposed that each piece of translation information 1311 is copied to the NAND memory 20 in the non-volatilization. Each piece of translation information 202 as illustrated in FIG. 2 are translation information non-volatilized from corresponding translation information 1311 stored in the RAM 13. It should be noted that each piece of translation information 1311 may be converted and stored to the NAND memory 20. More specifically, the format of each piece of translation information. 1311 and the format of each piece of translation information 202 may be different from each other.

It should be noted that the state of the translation information 1311 immediately after the update is dirty. "Dirty" indicates a state in which the content of the translation information. 1311 is different from the content of the translation information 202 written to the NAND memory 20 by the last non-volatilization from the translation information 1311. When dirty translation information 1311 is lost from the memory system 1, the user data 201 stored in the location indicated by the physical address mapped in the lost dirty translation information 1311 cannot be read from the host 2. Therefore, it is necessary to perform non-volatilization of the dirty translation information 1311. The CPU 11 controls the timing of the non-volatilization of the dirty translation information 1311 so that even if a power supply interruption occurs at any moment, the dirty translation information 1311 is not lost as much as possible. For example, during the normal operation, the memory system 1 non-volatilizes some or all of the dirty translation information 1311 when the total amount of dirty translation information 1311 becomes more than a threshold value determined in advance. For example, the threshold value is determined based on the capacity of the capacitor 40 providing the electric power for allowing the memory system 1 to execute the emergency power off sequence after the power supply interruption. After the power supply interruption, the memory system 1 non-volatilizes all the dirty translation information 1311 as a part of the power off sequence (emergency power off sequence, normal power off sequence).

Figure 4:
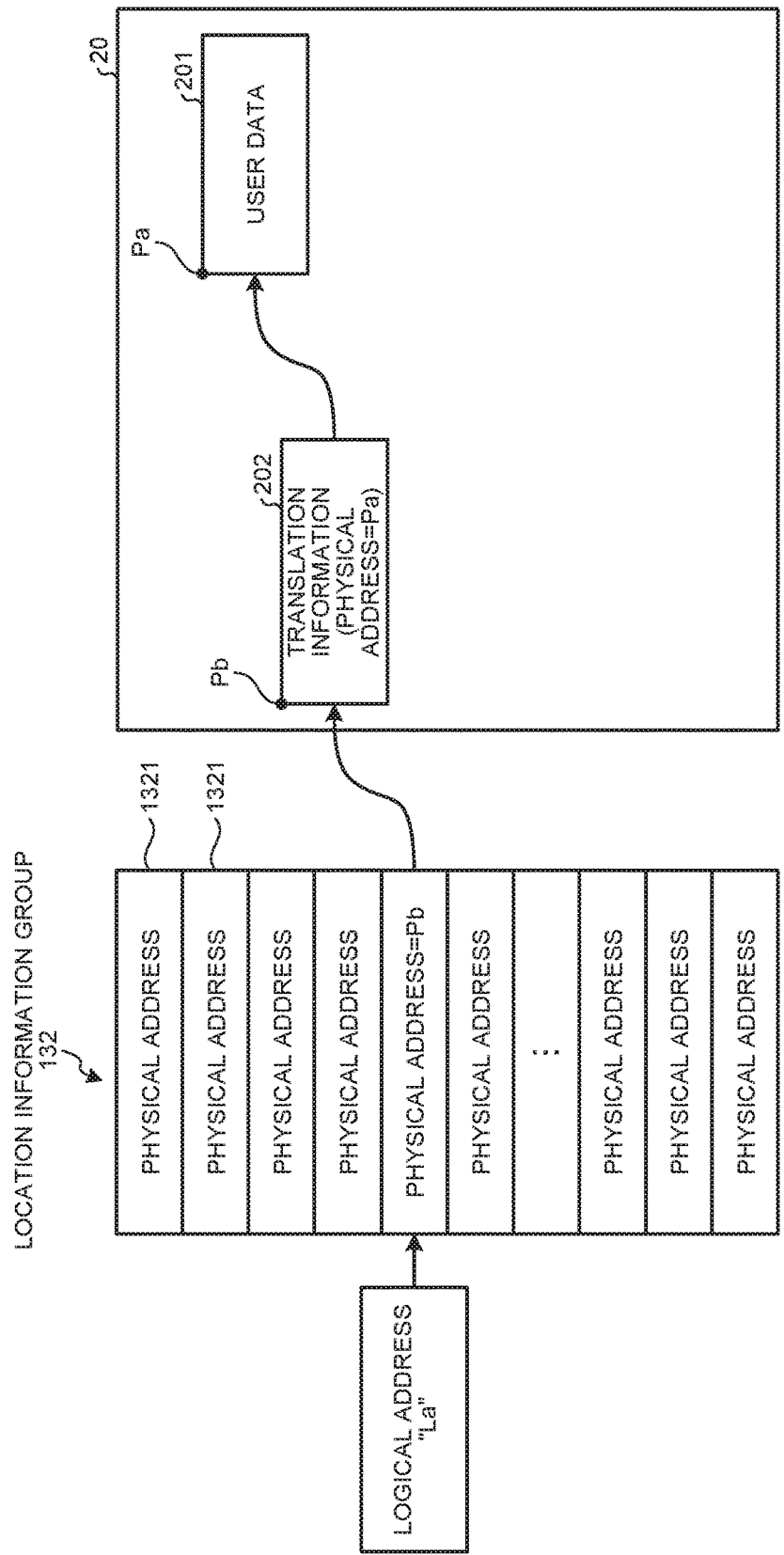
FIG. 4 is a figure illustrating an example of a data structure of a location information group according to the first embodiment.

FIG. 4 is a figure illustrating an example of data structure of the location information group 132. The location information group 132 includes a plurality of pieces of location information 1321. Each piece of location information 1321 corresponds to a piece of translation information 1311 included in the translation information group 131 in a one-to-one manner. That is, each piece of translation information 1311 included in the translation information group 131 corresponds to a piece of location information 1321 included in the location information group 132 in a one-to-one manner. The non-volatilization of a single piece of translation information 1311 may be executed a plurality of times during the normal operation of the memory system 1. Therefore, there may be a plurality of pieces of translation information 202 corresponding to a single piece of translation information 1311 in the NAND memory 20. In each piece of location information 1321, the physical address of the storage location of the latest copy of the corresponding translation information 1311 is written. The latest copy indicates the translation information 202 stored in the NAND memory 20 by the last non-volatilization of one or more pieces of translation information 202 of the corresponding translation information 1311. The pieces of location information 1321 are arranged in the same order as the corresponding translation information 1311. More specifically, the location information group 132 has a structure of a table in which a logical address is provided as an index, and the physical address indicating the storage location of the translation information 202 is provided as a data item. Each piece of location information 1321 corresponds to a data item of the table. According to an example of FIG. 4, a logical address "La" is associated with a physical address "Pb" by one of the plurality of pieces of location information 1321 constituting the location information group 132. The translation information 202 in which the physical address "Pa" is written is stored in the location indicated by the physical address "Pb". In the location indicated by the physical address "Pb", the user data 201 are stored, which have been sent from the host 2 designated to the logical address "La".

The location information group 132 is lost from the RAM 13 by the power supply interruption. The log (log 204 (see FIG. 5)) is recorded in the NAND memory 20 so that the location information group 132 can be recovered to the RAM 13 after returning from the power supply interruption. The recovering the location information group 132 indicates processing for returning at least the location information group 132 back to the state immediately before the power supply interruption. The state immediately before the power supply interruption indicates, for example, the state in which the translation information group 131 and the location information group 132 have been updated in response to all the user data 201 written to the NAND memory 20 before the power off sequence is completed. It should be noted that the recovery may also be referred to as restoring, rebuilding, reconstructing, or reconstituting. In this case, for example, the memory system 1 records a difference in an update of the location information group 132 as the log 204 in the NAND memory 20, and obtains the location information group 132 of the same state as the state immediately before the power supply interruption on the basis of the recorded log 204. A difference in an update of the location information group 132 corresponds to a difference in an update of the translation information group 131. A single log 204 is generated for every non-volatilization of single translation information 1311. In each log 204, the logical address as the index of the translation information 1311 which is the target of the non-volatilization and the physical address indicating the location of the write destination of the translation information 202 in the non-volatilization are associated with each other and written.

In the present embodiment, the logical address space of the memory system 1 is divided into a plurality of partial spaces. The location information group 132 is recovered in units of partial spaces. As a configuration for recovering the location information group 132 in units of partial spaces, the log area 203 storing the log 204 is separately allocated for every partial space in the NAND memory 20. More specifically, in the NAND memory 20, a plurality of log areas 203 are allocated. Each log area 203 is composed of, for example, one or more blocks. Each log area 203 may be composed of one or more pages.

Figure 5:
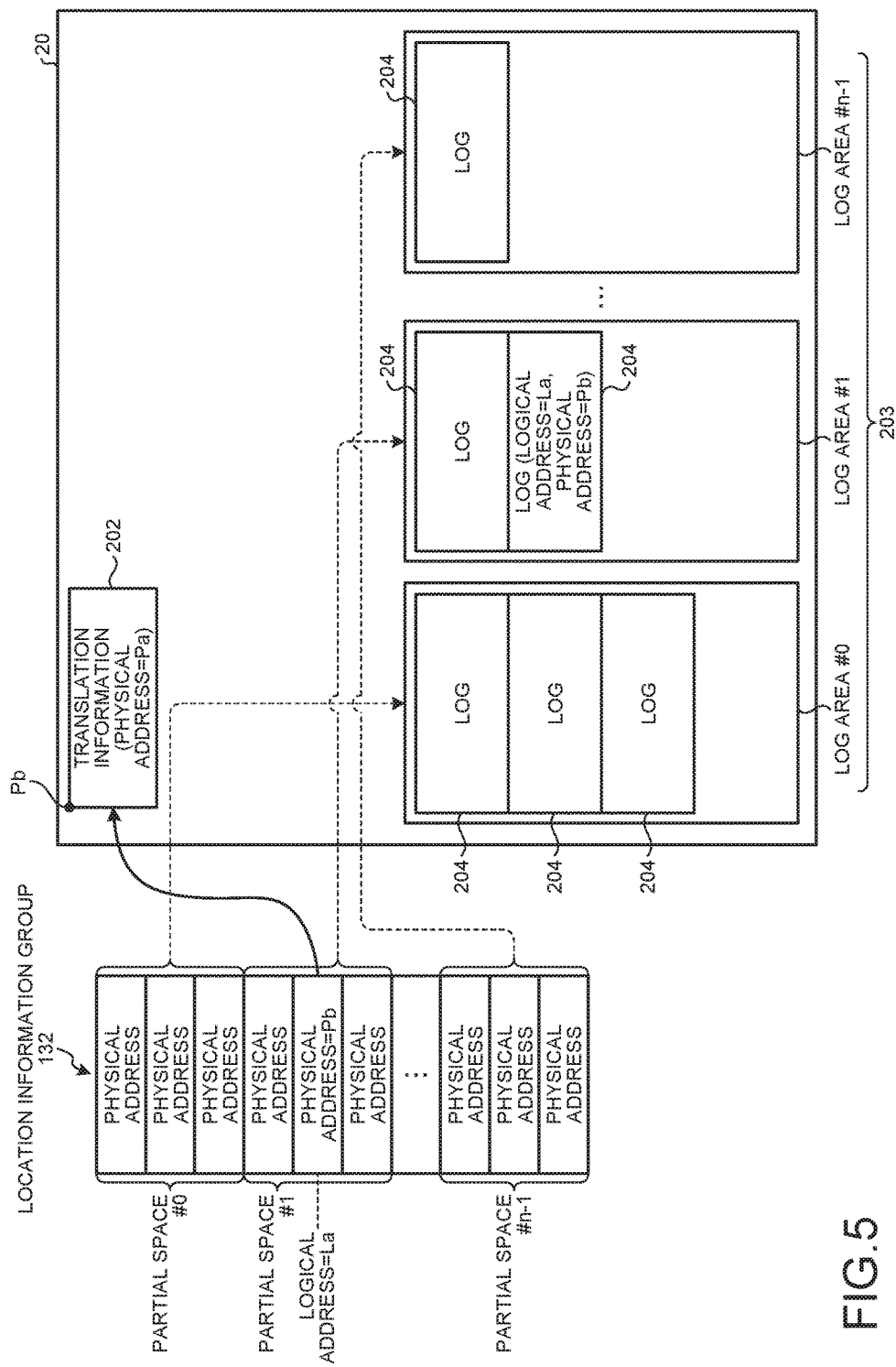
FIG. 5 is a figure for explaining a plurality of log areas according to the first embodiment.

FIG. 5 is a figure for explaining the plurality of log areas 203. In this case, the logical address space of the memory system 1 is divided into n partial spaces. Each of n partial spaces is identified by a number (#0 to #n−1). It should be noted that n log areas 203 are allocated in the NAND memory 20. Each of the n log areas 203 is identified by the number (#0 to #n−1) Each log area 203 corresponds to one of n partial spaces in a one to one manner. That is, each partial space corresponds to one of the n log areas 203 in a one to one manner. For example, a partial space #i (here, i is an integer satisfying 0≤i≤n−1) corresponds to a log area #i. In FIG. 5, an arrow with a dotted line indicates a correspondence relationship between each log area 203 and the partial space to which each piece of location information 1321 belongs.

In this case, in each of the partial spaces #0 to #n−1, the logical addresses are continuous. Therefore, the memory system 1 can identify a partial space to which a target logical address belongs, on the basis of a predetermined bit(s) at the higher side of the target logical address. It should be noted that, as long as the partial space to which the target logical address belongs can be identified by the target logical address, the logical addresses may not be continuous in each of the partial spaces #0 to #n−1.

For another example, in a case where NVMe® is employed as an interface standard of communication between the memory system 1 and the host 2, the memory system 1 can provide a plurality of logical address spaces each of which identified by a name space ID. Each of the plurality of logical address spaces is referred to as a name space. Each partial space may be a single name space different from each other. In such case, each partial space can be identified by a name space ID For yet another example, the memory system 1 may divide a single logical address space into a plurality of partitions. Each partial space may be a partition different from each other. In such case, each partial space can be identified by an identifier of the partition or a logical address range.

In a case where the logical address "Lx" is included in the partial space #x, the translation information 1311 for mapping the logical address "Lx" to the physical address will be denoted as the translation information 1311 belonging to the partial space #x. The location information 1321 in which the storage location of the translation information 202 as the latest copy of the translation information 1311 belonging to the partial space #x is written will be denoted as the location information 1321 belonging to the partial space #x. The log 204 generated in response to the non-volatilization of the translation information 1311 belonging to the partial space #x will be denoted as the log 204 belonging to the partial space #x. In a case where at least one piece of the location information 1321 belonging to the partial space #x is not yet recovered, it may be described as "the partial space #x is unrecovered". "The location information 1321 is unrecovered" means that the location information 1321 has not been recovered yet. "The location information 1321 is recovered" means that the location information 1321 of the same state as the state immediately before the power supply interruption has been stored at least once in the corresponding location of the location information group 132 since the memory system 1 had returned from the power supply interruption. In a case where the location information 1321 of the same state as the state immediately before the power supply interruption has been stored, and then the location information 1321 has been updated, the location information 1321 is also considered to be recovered. "The location information 1321 is unrecovered" means that the location information 1321 in the same state as the state immediately before the power supply interruption has never been stored into the corresponding location of the location information group 132 since the memory system 1 had returned from the power supply interruption. In a case where the location information 1321 indicating the location of the translation information 1311 for mapping the logical address "Lx" is unrecovered, it may be described as the "logical address "Lx" is unrecovered". The translation information 1311 found in the translation information group 131 using the logical address "Lx" as the index may be described as the translation information 1311 of the logical address "Lx". The location information 1321 found in the location information group 132 using the logical address "Lx" as the index may be described as the location information 1321 of the logical address "Lx".

According to the example of FIG. 5, the logical address "La" belongs to the partial space #1. The translation information 202 in which the physical address "Pa" is written is stored into the location indicated by the physical address "Pb" indicated by the location information 1321 of the logical address "La". More specifically, this translation information 202 maps the logical address "La" to the physical address "Pa". When this translation information 202 is stored into the NAND memory 20, a log 204 for associating the logical address "La" and the physical address "Ph" is generated. This log 204 is stored into the head of the vacant area of the log area #1. The vacant area means an area where no information is stored. Each log 204 is generated in the same order as the order in which the corresponding non-volatilization is executed. In the log area #i, one or more logs 204 which belongs to the partial space #1 are stored in the order of which the logs 204 are generated.

Figure 6:
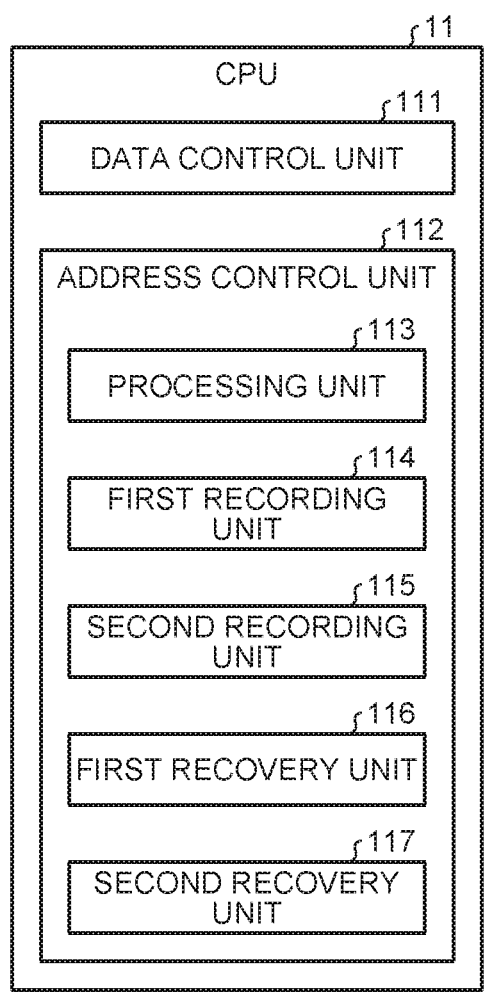
FIG. 6 is a figure illustrating a functional configuration realized by a CPU on the basis of a firmware according to the first embodiment.

FIG. 6 is a figure illustrating a functional configuration realized by the CPU 11 on the basis of a firmware. The CPU 11 includes a data control unit 111 and an address control unit 112.

The data control unit 111 executes data transfer between the host 2 and the NAND memory 20. The data control unit 111 transmits a translation request to the address control unit 112 in order to obtain the location of the access destination. The translation request is a request for translating the logical address into the physical address to which the logical address is mapped. For example, the translation request includes a logical address included in the access request.

The address control unit 112 includes a processing unit 113, a first recording unit 114, a second recording unit 115, a first recovery unit 116, and a second recovery unit 117. The processing unit 113 executes processing for translating the logical address into the physical address. The first recording unit 114 executes update of the translation information group 131 and the non-volatilization of each piece of translation information 1311. The second recording unit 115 executes recording of the log 204 and update of the location information group 132. The first recovery unit 116 executes the recovery of the location information group 132. The second recovery unit 117 executes the recovery of the translation information group 131. The recovery of the translation information group 131" means that some or all of the translation information group 131 of the same state as the state immediately before the power supply interruption is stored into the volatile memory after returning from the power supply interruption.

It should be noted that some or all of the data control unit 111, the processing unit 113, the first recording unit 114, the second recording unit 115, the first recovery unit 116, and the second recovery unit 117 may be realized by hardware or a combination of software and hardware.

Figure 7:
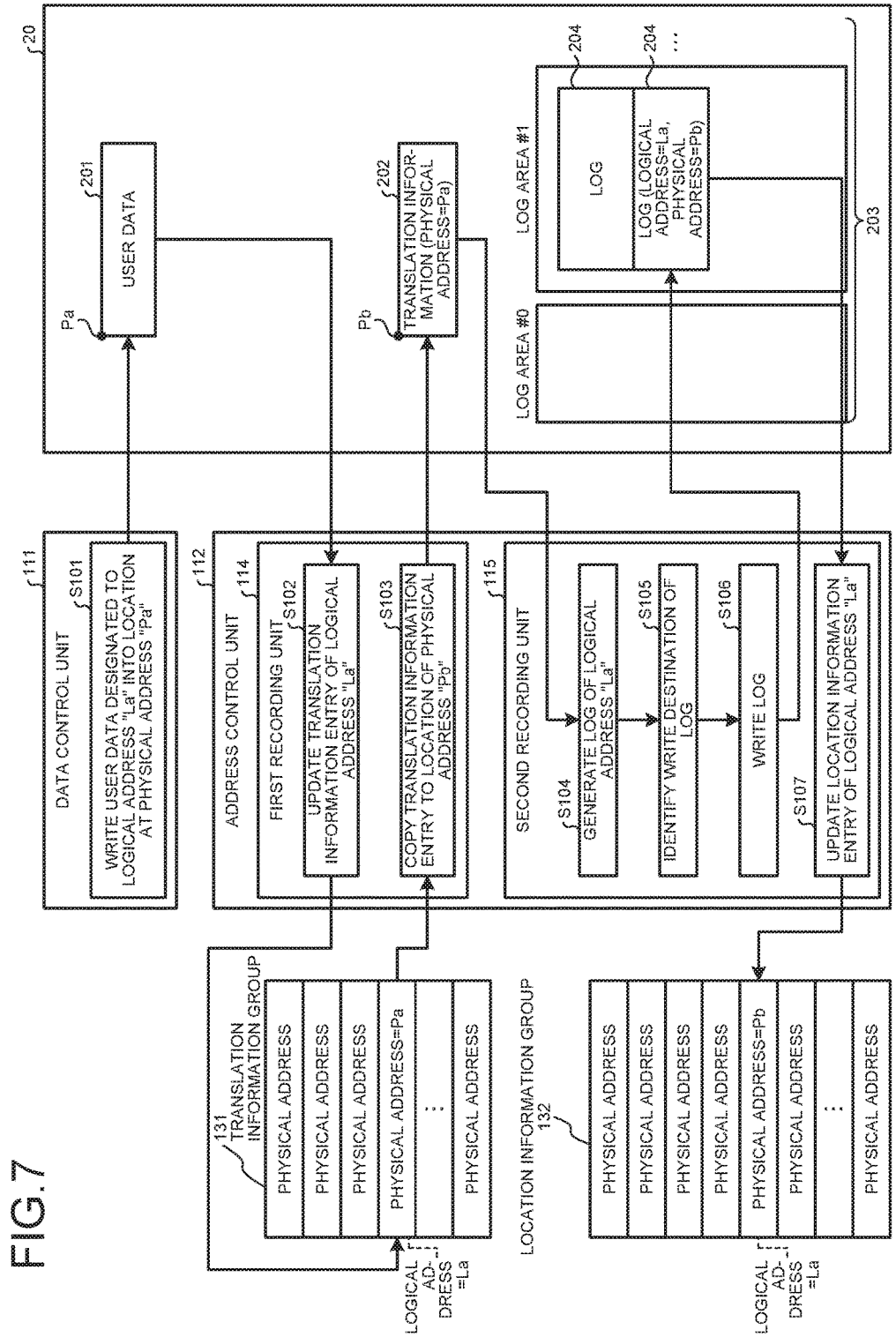
FIG. 7 is a figure for explaining operation of non-volatilization according to the first embodiment.

FIG. 7 is a figure for explaining operation of non-volatilization. In the figure, an arrow indicates a flow of information or a flow of processing. When the user data 201 which are received from the host 2 designating to the logical address "La" are written by the data control unit 111 to the NAND memory 20 (S101), the first recording unit 114 updates the translation information 1311 about the logical address "La" (S102). More specifically, in a case where the physical address of the write destination of the processing of S101 is "Pa", the first recording unit 114 writes the physical address "Pa" to the translation information 1311 about the logical address "La" in an overwriting manner.

When the first recording unit 114 reaches the timing of the non-volatilization, the first recording unit 114 non-volatilizes the translation information 1311 regarding the logical address "La" to the NAND memory 20 (S103). Then, the second recording unit 115 generates a log 204 (S104). For example, the translation information 1311 regarding the logical address "La" is written in the location indicated by the physical address "Pb" by the processing of S103, the second recording unit 115 generates a log 204 for associating the logical address "La" and the physical address "Pb" in the processing of S104.

Subsequently, the second recording unit 115 identifies the log area 203 of the storage destination for the log 204 generated in the processing of S104 (S105). In this case, the log 201 generated in the processing of S104 belongs to the partial space #1. Therefore, the second recording unit 115 identifies the log area #1 as the log area 20:3 of the storage destination for the log 204 generated in the processing of S104. The second recording unit 115 stores the log 204 generated in the processing of S104 to the head of the vacant area into the log area 203 identified (S106). Then, the second recording unit 115 updates the location information 1321 of the logical address "La" (S107). More specifically, the second recording unit 115 writes the physical address "Pb" to the location information 1321 of the logical address "La" in an overwriting manner.

The operation of the non-volatilization of a single piece of translation information 1311 is terminated in the processing of S107. In the explanation about this case, the location information 1321 is updated before or after the log 204 is updated. Alternatively, the location information 1321 may be updated before the log 204 is generated or before the log 204 is stored.

Figure 8:
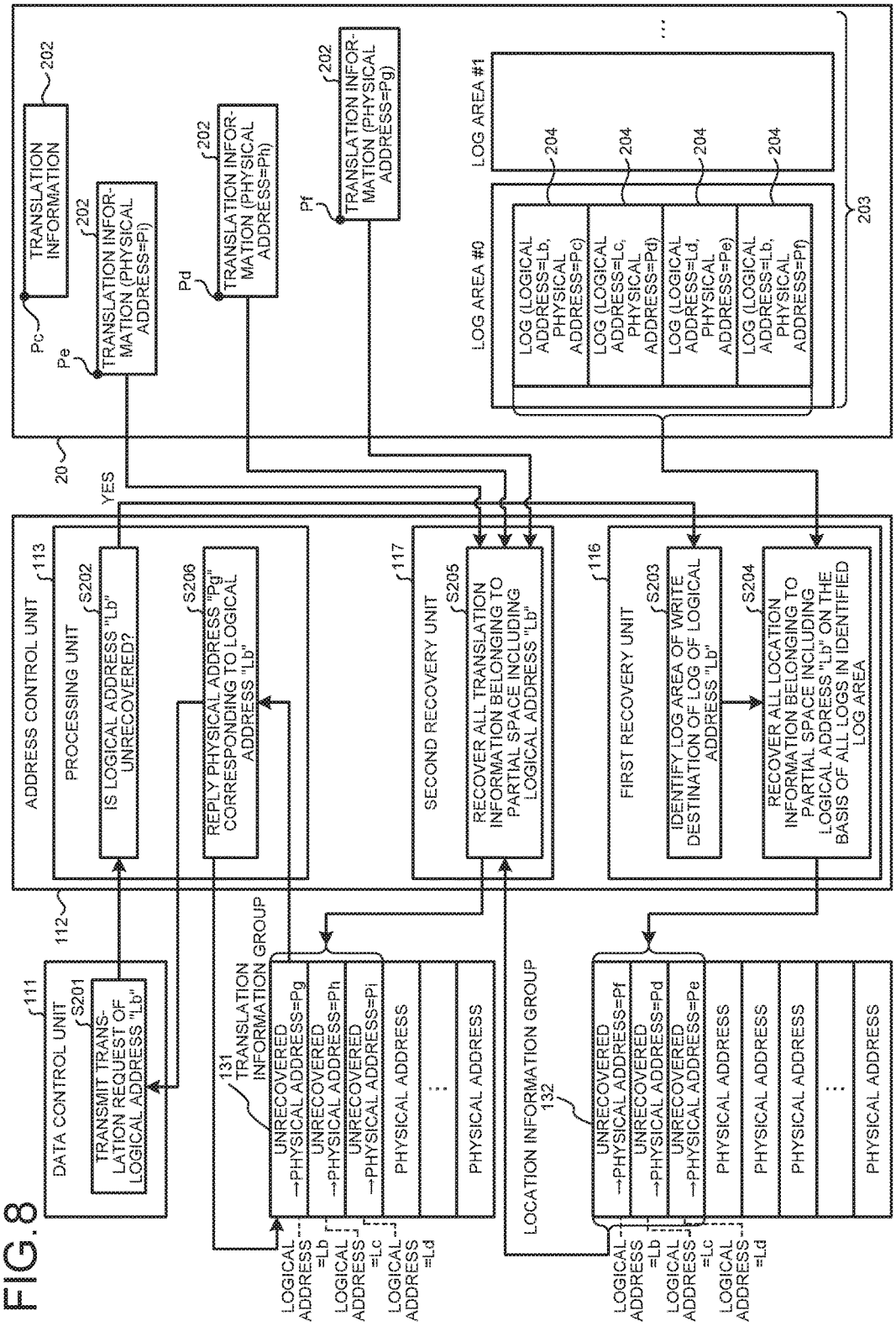
FIG. 8 is a figure for explaining operation of on-demand recovery according to the first embodiment.

In the first embodiment, after returning from the power supply interruption, automatic recovery is not executed. The recovery of, at least, the translation information 1311 and the location information 1321 belonging to the unrecovered partial space is started with, as a trigger, the attempt to use the translation information 1311 belonging to the unrecovered partial space. The use includes reference or update. The recovery of information regarding the partial space started with, as a trigger, the attempt to use the translation information 1311 will be denoted as an on-demand recovery. FIG. 8 is a figure for explaining operation of the on-demand recovery. It should be noted that, in this case, not only the location information 1321 but also the translation information 1311 are recovered in units of partial space in the on-demand recovery.

First, the data control unit 111 transmits a translation request to the address control unit 112 (S201). In the explanation about this case, the translation request of the logical address "Lb" belonging to the partial space #0 is transmitted. The partial space #0 is considered to be unrecovered. Subsequent to the processing of S201, the processing unit 113 determines whether the logical address "Lb" which is the target of the translation is unrecovered (S202). "A logical address is unrecovered" means that translation information 1311 which includes the logical address as an index and which is in the same state as the state immediately before the power supply interruption has never been stored since the memory system 1 had returned from the power supply interruption.

Any method is applied as the method of S202. For example, the first recovery unit 116 generates the location information group 132 in which the initial values that cannot be used as the physical addresses are written in all the entries immediately after the return from the power supply interruption. With the recovery of each partial space, the initial values are overwritten with the physical addresses written before the power supply interruption. The processing unit 113 can determine whether the logical address "Lb" which is the target of the translation is unrecovered by determining whether the initial value is written in the location information 1132 of the logical address "Lb".

According to another example of the method of S202, immediately after the return from the power supply interruption, the second recovery unit 117 generates the translation information group 131 of which initial values that cannot be used as the physical addresses are written in all the entries. With the recovery of each partial space, the initial values are overwritten with the physical addresses written before the power supply interruption. The processing unit 113 can determine whether the logical address "Lb" which is the target of the translation is unrecovered by determining whether the initial value is written in the translation information 1311 of the logical address "Lb".

According to another example of the method of S202, the processing unit 113 manages, for every partial space, information in which whether recovery of the translation information group 131 has been done or not is written. The processing unit 113 can determine whether the logical address "Lb" which is the target of the translation is unrecovered by referring to the information in which whether recovery of the translation information group 131 has been done or not is written.

In the explanation about FIG. 8, the logical address "Lb" which is the target of the translation is considered to be unrecovered. In a case where the logical address "Lb" which is the target of the translation is determined to be unrecovered, the first recovery unit 116 identifies the log area 203 corresponding to the partial space including the logical address "Lb" (S203). Since the logical address "Lb" is included in the partial space #0, the log area #0 is identified in the processing of S203. The first recovery unit 116 recovers all pieces of location information 1321 belonging to the partial space #0 including the logical address "Lb" on the basis of all the logs 204 stored in the identified log area #0 (S204).

Figure 9:
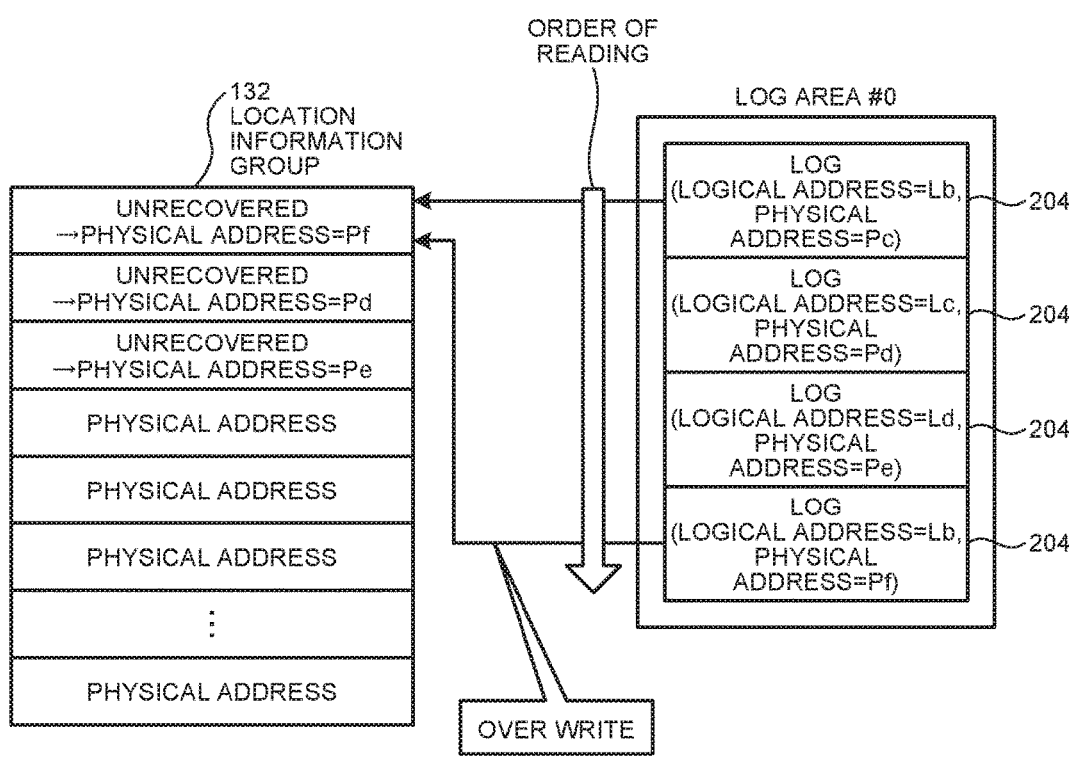
FIG. 9 is a figure for explaining an example of a method of recovery of location information of a partial space unit according to the first embodiment.

Any method may be employed as the method of recovery of the location information 1321 in units of partial spaces. For example, as illustrated in FIG. 9, the first recovery unit 116 reads each of all the logs 204 stored in the log area #0 in the same order as the order in which the logs 204 are stored. The first recovery unit 116 reads the log 204 stored for the i-th time, and subsequently reads the log 204 stored for the (i+1)-th time. On every read of the log 204, the first recovery unit 116 writes the physical address recorded in the read log 204 to the location corresponding to the logical address recorded in the read log 204 in the location information group 132 in an overwriting manner. More specifically, the first recovery unit 116 writes the physical address recorded in the read log 204 to the location information group 132 for every logical address in an overwriting manner. In the processing of S204, the first recovery unit 116 executes the above processing on the logs 204 up to the log that is lastly stored in the log area #0. For example, according to the example of FIG. 8 and FIG. 9, the log 204 for associating the logical address "Lb" and the physical address "Pc", the log 204 for associating the logical address "Lc" and the physical address "Pd", the log 204 for associating the logical address "Ld" and the physical address "Pe", and the log 204 for associating the logical address "Lb" and the physical address "Pf" are read from the identified log area 203 in the order described above. Two logs 204 related to the logical address "Lb" are read out. According to the log read first among the two logs 204 related to the logical address "Lb", which is associating the logical address "Lb" and the physical address "Pc", the physical address "Pc" is written to the location corresponding to the logical address "Lb" in the location information group 132. According to the log read subsequently among the two logs 204 related to the logical address "Lb", which is associating the logical address "Lb" and the physical address "Pf", the physical address "Pf" is written to the location corresponding to the logical address "Lb" in the location information group 132 in an overwriting manner. Therefore, when the recovery of the partial space #0 is completed, the logical address "Lb" is associated with the physical address "Pf" by the location information group 132. It should be noted that, in a case of this embodiment in which a mechanism of a snapshot (described later) is not applied, to recover all of the location information 1321, translation information 1311 of the latest generation and a log 204 of the latest generation for each logical address are required. In NAND memory 20, a memory area for translation information 1311 and each log area 203 which have enough size for storing at least translation information 1311 of the latest generation and a log 204 of the latest generation for each logical address are allocated. The size of the memory area for translation information 1311 and each log area 203 is not restricted as described above.

The RAM 13 may be composed of a combination of a large capacity DRAM and a small capacity SRAM. A write speed to a DRAM is faster than that to a NAND memory, and is slower than that to an SRAM. The first recovery unit 116 may generate, on the SRAM on the basis of the log 204, the portion belonging to the partial space of the recovery target in the location information group 132. The first recovery unit 116 moves, to the DRAM, the portion belonging to the recovery target partial space in the generated location information group 132. Since a write amount for the DRAM becomes lower in the case of recovering the location information 1321 on the SRAM than in the case of recovering the location information 1321 on the DRAM, thereby reducing time period for processing the recovery of the partial space.

Figure 10:
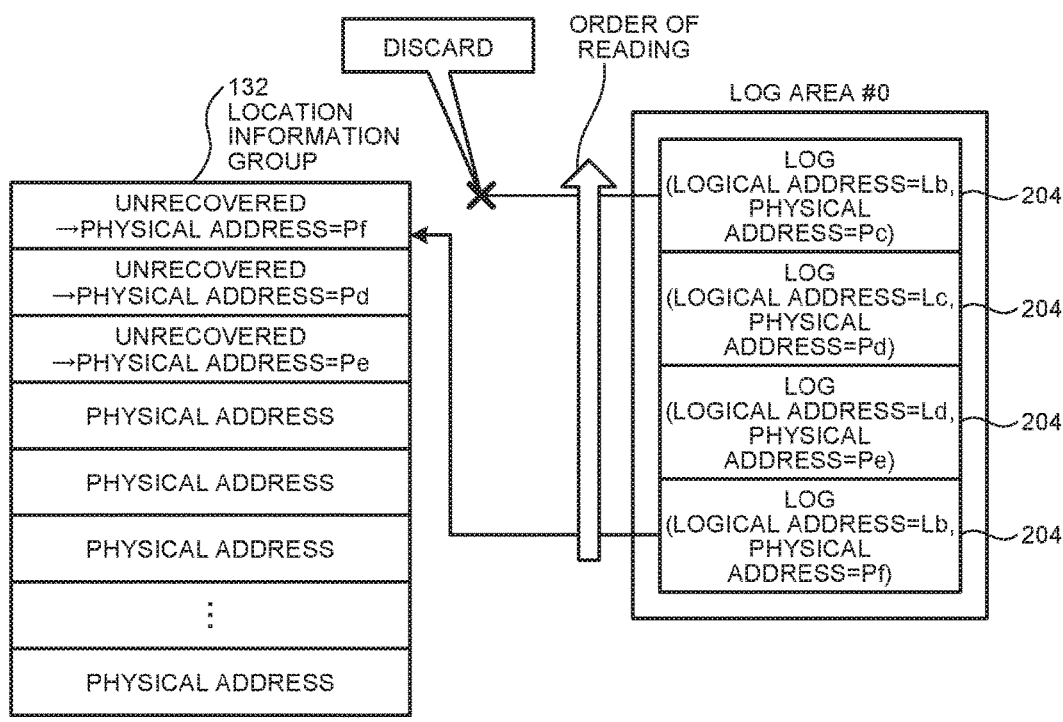
FIG. 10 is a figure for explaining another example of a method of recovery of location information of a partial space unit according to the first embodiment.

According to another method of recovery of the location information 1321 in units of partial spaces, as illustrated in FIG. 10, the first recovery unit 116 reads each of all the logs 204 stored in the log area #0 in the order opposite to the order in which the logs 204 are stored. The first recovery unit 116 reads the log 204 stored in the i-th time, and subsequently, the first recovery unit 116 reads the log 204 stored in the (i−1)-th time. On every reading of the log 204, the first recovery unit 116 determines whether a physical address is already written to the location corresponding to the logical address recorded in the read log 204 in the location information group 132. In a case where a physical address is determined not to be already written to the location corresponding to the logical address recorded in the read log 204 in the location information group 132, the first recovery unit 116 writes the physical address recorded in the read log 204 to the location corresponding to the logical address recorded in the read log 204 in the location information group 132. In a case where a physical address is determined to be already written to the location corresponding to the logical address recorded in the read log 204 in the location information group 132, the first recovery unit 116 does not write the physical address recorded in the read log 204 to the location information. In the processing of S204, the first recovery unit 116 executes the above processing on the logs 204 up to the log 204 stored first in the log area #0. For example, according to the examples of FIG. 8 and FIG. 10, according to the log read first among the two logs 204 related to the logical address "Lb", which is associating the logical address "Lb" and the physical address "Pf", the physical address "Pf" is written to the location corresponding to the logical address "Lb" in the location information group 132. Then, by disregarding the log read subsequently among the two logs 204 related to the logical address "Lb", which is associating the logical address "Lb" and the physical address "Pc", the physical address "Pc" is not written to the location corresponding to the logical address "Lb" in the location information group 132. Therefore, the logical address "Lb" is associated with the physical address "Pf" by the location information group 132. It should be noted that, in a case where it is able to detect a completion of recovery for a partial space, recovering all the logs 204 in each log area 203 is not required. For example, in a case where the first recovery unit 116 reads each of the logs 204 stored in the log area #0 in the order opposite to the order in which the logs 204 are stored, the first recovery unit 116 counts the number of unrecovered partial spaces, and terminate reading of the logs when the number of unrecovered partial spaces becomes zero.

It should be noted that, in a case where a method is employed to read each log 204 from the log area 203 in the order opposite to the order in which the logs 204 are stored, the first recovery unit 116 may once recover the location information 1321 on the SRAM, and thereafter, the recovered location information 1321 may be copied to the DRAM. Therefore, the speed of the recovery of the partial space is improved more greatly than the case where the first recovery unit 116 recovers the location information 1321 on the DRAM.

After the processing of S204, the second recovery unit 117 recovers all the translation information 1311 belonging to the partial space #0 on the basis of all the location information 1321 belonging to the partial space #0 (S205). According to the location information group 132, the translation information 202 about the logical address "Lb" is stored to the location indicated by the physical address "Pf". The second recovery unit 117 reads the translation information 202 from the location indicated by the physical address "Pf" to the location corresponding to the logical address "Lb" and recovers the translation information 131 in the second memory. According to the location information group 132, the translation information 202 about the logical address "Lc" is stored to the location indicated by the physical address "Pd". The second recovery unit 117 reads the translation information 202 from the location indicated by the physical address "Pd" to the location corresponding to the logical address "Lc" and recovers the translation information 131. According to the location information group 132, the translation information. 202 about the logical address "Ld" is stored to the location indicated by the physical address "Pe". The second recovery unit 117 reads the translation information 202 from the location indicated by the physical address "Pe" to the location corresponding to the logical address "Ld" and recovers the translation information 131.

After the processing of S205, the processing unit 113 refers to the translation information group 131, thereby obtaining the physical address "Pg" corresponding to the logical address "Lb", and responds the obtained physical address "Pg" to the data control unit 111 (S206).

In this explanation, with the on-demand recovery, not only the location information 1321 but also the translation information 1311 are recovered in units of partial spaces. Alternatively, the second recovery unit 117 may be configured such that, after the location information 1321 is recovered in units of partial spaces, only the translation information 1311 of the logical address requested by the translation request may be recovered.

In this explanation, the on-demand recovery is executed in response to an access request from the host 2. Alternatively, the on-demand recovery may be executed in response to translation occurred in the internal processing of the memory system 1. For example, the internal processing includes garbage collection, refreshing, or wear levelling.

The garbage collection means processing for moving (copying) at least valid user data 201 from a certain block to a vacant area of another block and thereafter regarding all the user data 201 stored in the block of the source on the moving as invalid data. After the garbage collection, the block of the source of copying is regarded as a free block. After the erasing is executed, each free block is in a state of not storing any data and a state in which new data can be programmed. The memory controller 10 updates the corresponding translation information 1311 in response to the copying of the valid user data 201. The memory controller 10 executes the on demand recovery in a case where the translation information 1311 of the update target is unrecovered in the garbage collection.

It should be noted that the user data 201 stored in the NAND memory 20 are in any one of the valid state and the invalid state. In the state where the first user data 201 are stored in the NAND memory 20 which had been sent from the host 2 designating to a logical address, when the second user data 201 have been sent from the host 2 designating to the same logical address, the memory controller 10 writes the second user data 201 to a block having a vacant page, and manages the first user data 201 as invalid user data 201. Here, the "vacant" state means a state of storing neither the invalid user data 201 nor the valid user data 201. The vacant page means a vacant, area to which data can be written. Writing to the NAND memory 20 is performed according to such a method, and therefore, each block stores the invalid user data 201 and the valid user data 201. "Data are valid" means that the data are in the latest state. In a case where a plurality of pieces of user data 201 sent with the designation of the same logical address are stored to the NAND memory 20, the latest state means a state of one of the plurality of pieces of user data 201 that are sent lastly by the host 2. In a case where the one of the plurality of pieces of user data 201 that are sent lastly by the host 2 is copied by the garbage collection, the user data 201 generated lastly by the copy corresponds to the user data 201 in the latest state. The invalid user data 201 mean pieces of the plurality of pieces of user data 201 that are other than the user data 201 that are sent lastly by the host 2. In a case where the one of the plurality of pieces of user data 201 that are sent lastly by the host 2 is copied by the garbage collection, the user data 201 other than the user data 201 generated lastly by the copy corresponds to the user data 201 in the invalid state. In a case where the memory controller 10 is configured to use corresponding piece of translation information. 1311 upon deciding whether user data 201 are valid or invalid in the garbage collection, the memory controller 10 may start the on-demand recovery in response to using the corresponding piece of translation information 1311.

The refreshing means processing of reading user data 201 from the NAND memory 20, and then programming the read user data 201 to the NAND memory 20. NAND memory 20 is composed of a plurality of memory cell transistors (memory cells). In programming, a threshold voltage of each memory cell is controlled to be within a range corresponding to a data value. A relation between the range and the data value is designed in advance. However, the threshold voltage of the memory cell tends to change with elapsed time or by being accessed. The changed data value is detected as an error, and then, is corrected by error correction function. However, the capability of the error correction function has a limitation. To prevent the number of errors from exceeding the limitation of the capability of the error correction function, user data 202 programmed in the NAND memory 20 are refreshed at a predetermined timing. The user data 202 programmed in the NAND memory 20 are moved by the refreshing. At the moving the user data 202, the memory controller 20 uses corresponding translation information 1311. The memory controller 20 executes the on-demand recovery in a case where the corresponding translation information 1311 is unrecovered upon the memory controller 20 uses the corresponding translation information 1311 in refreshing.

The wear levelling is processing for leveling the numbers of writing of the blocks among the plurality of blocks. One of wear levelling includes processing for moving the valid user data 201 among blocks. When the valid user data 201 are moved, the memory controller 10 uses the corresponding translation information 1311. The memory controller 10 executes the on-demand recovery in a case where the translation information 1311 is used in the course of the wear levelling and the translation information 1311 is unrecovered.

Therefore, according to the first embodiment, the memory controller 10 does not continuously recover all the location information 1321 belonging to the location information group 132, and instead, the memory controller 10 recovers the location information group 132 for every partial space. In other words, from when the recovery of a partial space is completed to when the recovery of another partial space is started, the memory controller 10 can execute any given processing different from the recovery (for example, accepting an another access request, processing for another access, and the like). Upon accepting an access request, the memory controller 10 starts an on-demand recovery of a partial space of the destination of the access request. In the first embodiment, the recovery of each partial space is executed respectively on demand. The memory controller 10 can return a response to the access request to the host 2 without recovering all the address spaces. Therefore, the memory controller 10 can return a response to the access request in a shorter time as compared with the case where all the location information. 1321 belonging to the location information group 132 are continuously recovered. "All the location information 1321 belonging to the location information group 132 are continuously recovered" means that the memory controller 10 is prohibited from executing any given processing (for example, accepting any other access request or processing the access request) different from the recovery of the location information group 132 from the start of the recovery to the completion of the recovery.

In a case where the recovery of the location information group 132 is started automatically immediately after the booting, a request from the host 2 cannot be processed before the recovery of the location information group 132 is completed. In the first embodiment, "the recovery of the location information group 132 is started automatically immediately after the booting" means that the recovery of the location information group 132 is started when a condition in which the memory system 1 begins to boot is satisfied. According to the first embodiment, the memory controller 10 does not automatically start the recovery of the location information group 132 immediately after the booting, and instead, the memory controller 10 executes the recovery of the location information group 132 for every partial space in response to the attempt to use the translation information group 131. Therefore, after the booting, the memory controller 10 can start the processing according to the request from the host 2 in a shorter time as compared with the case where the recovery of the location information group 132 is automatically started immediately after the booting.

The plurality of log areas 203 are separately allocated in the NAND memory 20 as the areas for storing the logs 204. A log 204 belonging to a partial space #a and a log 204 belonging to the partial space #b which is the partial space different from the partial space #a are stored in log areas 203 different from each other. The recovery in units of partial spaces can be performed by using the log 204 that is read by reading the log 204 from a single log area 203, and therefore, it is easy to execute the location information group 132 in units of partial spaces.

It should be noted that the plurality of log areas 203 may not be allocated separately. For example, without distinguishing the partial space from each other, all the logs 204 may be stored in a single log area 203. In such case, for example, the memory controller 10 holds information recorded with the partial space to which each log 204 belongs (partial space information). In the recovery of the location information group 132, the memory controller 10 selects and uses only the log 204 belonging to the recovery target partial space on the basis of the partial space information.

Second Embodiment

According to the second embodiment, a memory system 1 can automatically start recovery of a location information croup 132 with timing that is set in advance. The recovery that is started automatically will be referred to as background recovery. The second embodiment as well as the first embodiment are applied to, for example, the memory system 1.

Figure 11:
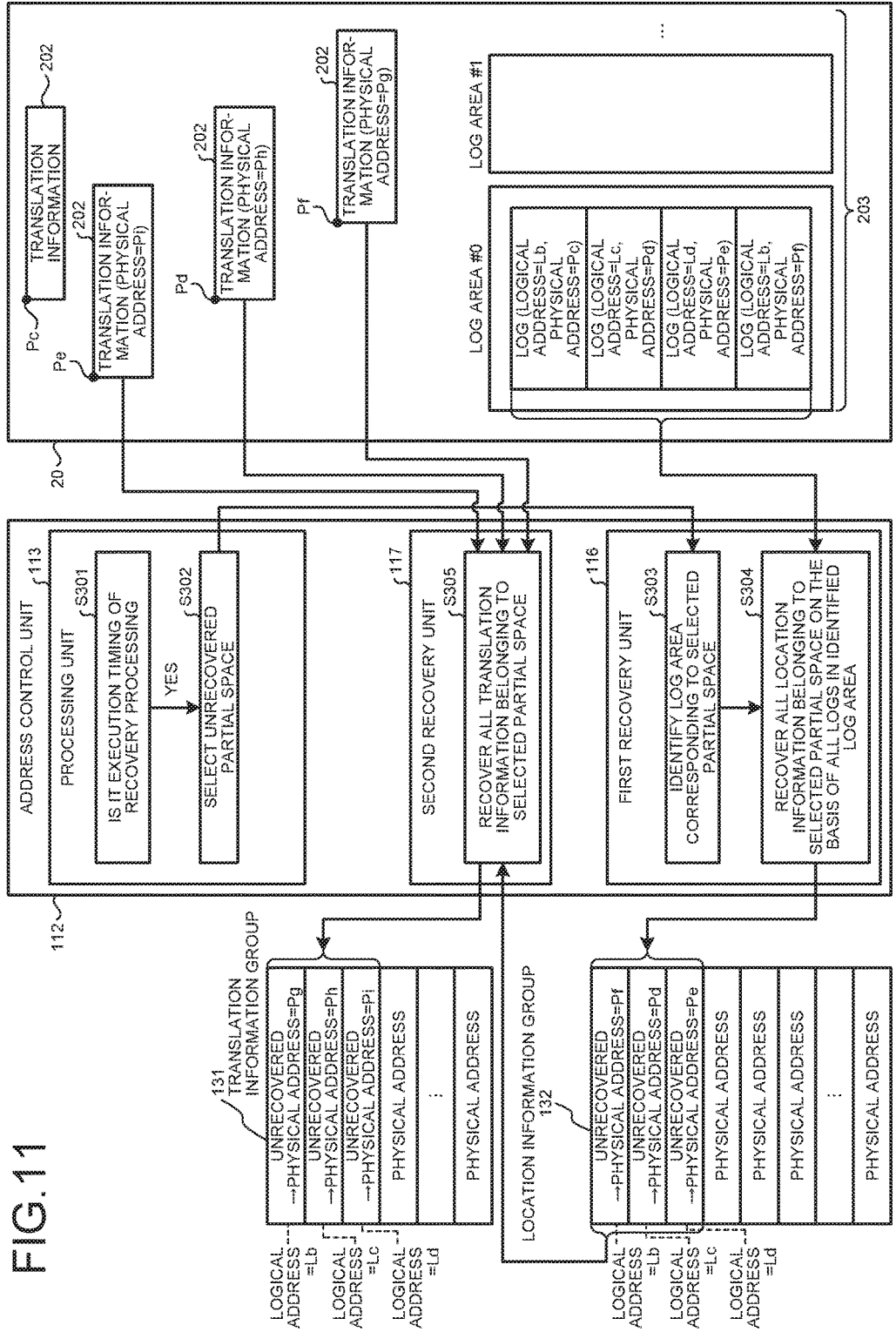
FIG. 11 is a figure for explaining operation of background recovery according to a second embodiment.

FIG. 11 is a figure for explaining operation of background recovery. It should be noted that a processing unit 113 determines whether there is an unrecovered partial space or not. In the example of FIG. 11, a case where there remains an unrecovered partial space will be explained.

First, the processing unit 113 determines whether it is execution timing of the background recovery (S301). When it is not yet the execution timing of the background recovery, the processing unit 113 executes the processing of S301 again.

For example, when a predetermined threshold time has elapsed since the last background recovery has been completed, the processing unit 113 determines that it is the execution timing of the background recovery. The processing unit 113 measures the elapsed time by using, for example, a software timer or a hardware timer. For example, when a predetermined threshold time has elapsed since the processing other than the background recovery had been completed, the processing unit 113 determines that it is the execution timing of the background recovery.

For example, when the state of the memory system 1 is the idle state, the processing unit 113 determines that it is the execution timing of the background recovery. The idle state is a state in which none of the processing in response to the request from the host 2 nor the internal processing is being executed. When previously determined processing of all the processing is not being executed, for example, the processing unit 113 determines that it is the execution timing of the background recovery.

When it is the execution timing of the background recovery, the processing unit 113 selects one unrecovered partial space (S302). In this case, the partial space #0 is considered to be selected. The first recovery unit 116 identifies the log area #0 corresponding to the selected partial space #0 (S303). Then, like the processing of S204 of FIG. 8, the first recovery unit 116 recovers all the location information 1321 belonging to the partial space #0 on the basis of all the logs 204 stored in the identified log area #0 (S304).

After the processing of S304, the second recovery unit 117 recovers all the translation information 1311 belonging to the partial space #0 on the basis of all the location information 1321 belonging to the partial space #0 like the processing of S205 of FIG. 8 (S305). In a case where there still remains an unrecovered partial space after the processing of S305, the plurality of the processing after S301 is executed again.

As described above, according to the second embodiment, the memory controller 10 can automatically start the recovering of the partial spaces. The memory controller 10 can execute any given processing different from the recovery (for example, processing of another access request and the like) from when the background recovery is completed to when subsequent background recovery is started. The recovery of the partial spaces is performed automatically even if the translation information 1311 is not tried to be used yet, and therefore, frequency of executing the on-demand recovery is suppressed, and as a result, the overhead due to the execution of the on-demand recovery is reduced.

Third Embodiment

According to the third embodiment, a memory system 1 starts recovery of location information group 132 on the basis of a request from a host 2 (hereinafter referred to as a recovery request).

Figure 12:
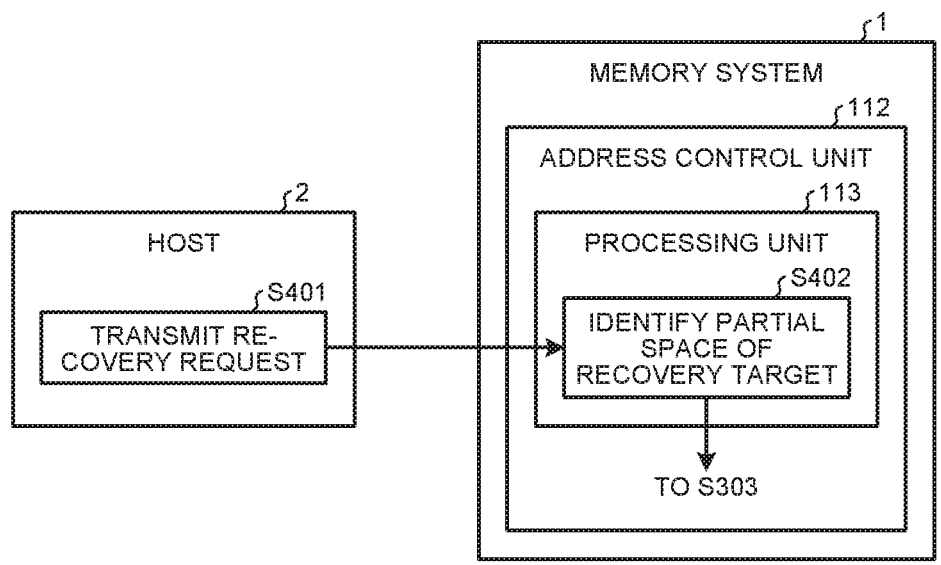
FIG. 12 is a figure for explaining operation of recovery in response to a recovery request according to a third embodiment.

FIG. 12 is a figure for explaining operation of recovery according to a recovery request.

First, the host 2 transmits a recovery request (S401). When the memory system 1 receives the recovery request, the processing unit 113 identifies a recovery target partial space in the memory system 1 (S402). The range of the recovery target logical address is designated by the range of the logical address or the logical address in the recovery request. In a case where the range of the recovery target logical address is included in the recovery request, the processing unit 113 identifies the recovery target partial space on the basis of the range of the recovery target logical address included in the recovery request. When there are a plurality of recovery target partial spaces, the subsequent processing on the plurality of partial spaces is executed. In a case where the range of the recovery target logical address is designated by the logical address, the processing unit 113 identifies the partial space including the designated logical address as the recovery target.

Subsequently, with regard to the identified partial space, the same processing as the processing of S303 to S305 of FIG. 11 are executed.

As described above, the memory controller 10 performs the recovery of the partial space on the basis of the recovery request from the host 2, and therefore, in a case where the recovery request is received from the host 2 in advance and thereafter the access request is received, a response to the access request can be returned in a shorter time.

It should be noted that the recovery request may designate the recovery target partial space using a name space ID.

Fourth Embodiment

According to the fourth embodiment, in a case where the memory system 1 receives a plurality of access requests corresponding to an access pattern of a sequential access, the memory system 1 executes recovery of a partial space that follows an access destination partial space should be noted that "following the access destination partial space" means that "neighboring at the side where the logical address is larger than the access destination partial space". There may be a gap or there may not be any gap between the access destination partial space and a partial space following the access destination partial space. The recovery of the partial space following the access destination partial space is expressed as a prefetch recovery. It should be noted that the sequential access means such an access pattern that the access destinations of the plurality of access requests issued successively are continuous on the logical address space.

Figure 13:
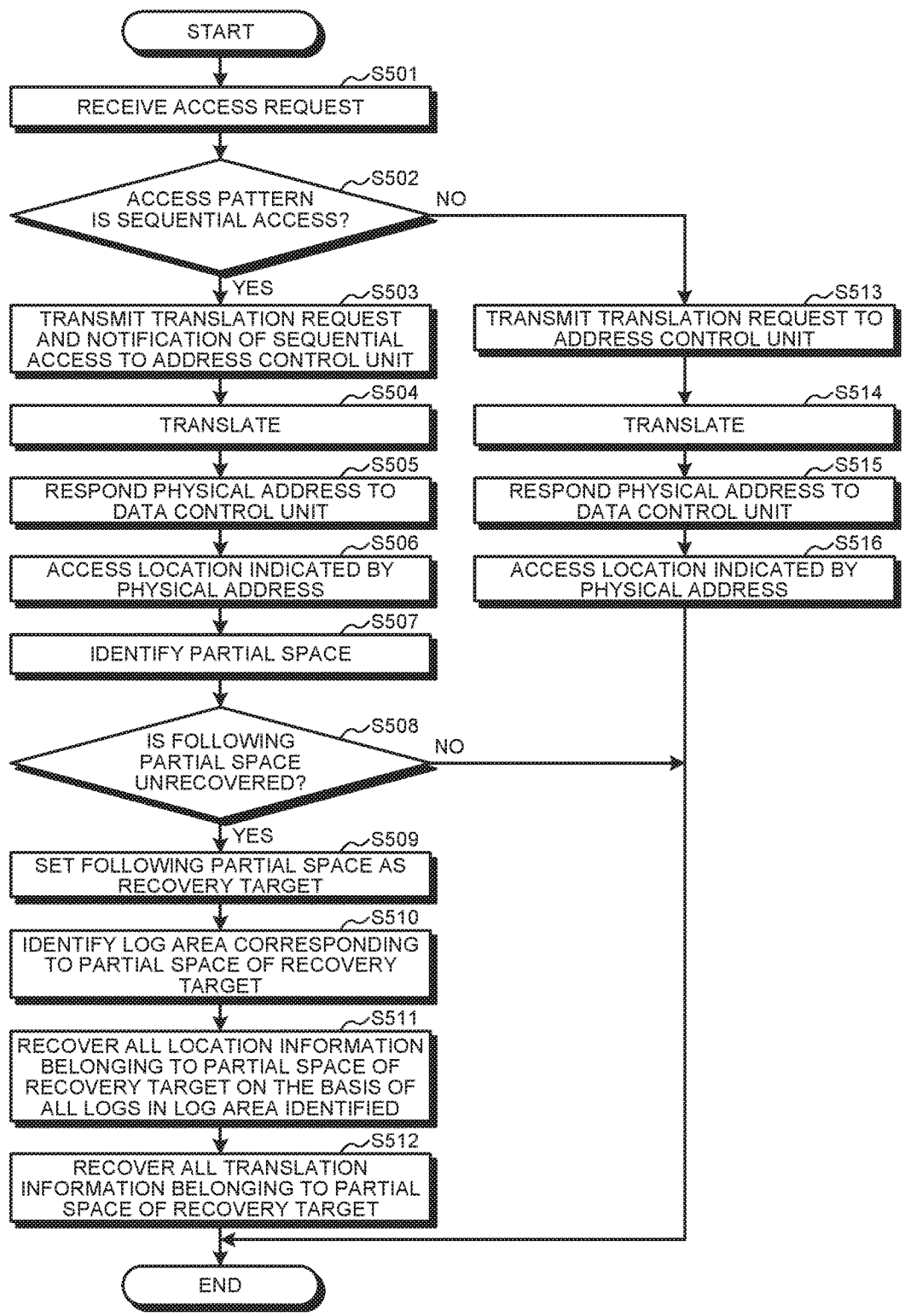
FIG. 13 is a figure for explaining operation of prefetch recovery according to a fourth embodiment.

FIG. 13 is a figure for explaining operation of prefetch recovery. When the memory system 1 receives an access request from the host 2 (S501), the memory system 1 determines whether the pattern of the access based on the access request received from the host 2 corresponds to a sequential access or not (S502).

For example, the data control unit 111 memorizes a predetermined number of access requests received recently. In a case where the memory system 1 is connected to a plurality of hosts 2, the data control unit 111 memorizes a predetermined number of access requests separately for each host 2. The data control unit 111 determines whether the range of the access destination of each of the access request transmitted in the processing of S501 and the memorized predetermined number of access requests is continuous on the logical address space or not. In a case where the range of the access destination of each of the access request transmitted in the processing of S501 and the memorized predetermined number of access requests is determined to be continuous on the logical address space, the data control unit 111 determines that the pattern of the access based on the access request newly received from the host 2 in the processing of S501 corresponds to a sequential access. In a case where the range of the access destination of each of the access request newly received from the host 2 in the processing of S501 and the memorized predetermined number of access requests is determined not to be continuous on the logical address space, the data control unit 111 determines that the pattern of the access based on the access request newly received from the host 2 in the processing of S501 does not correspond to a sequential access. It should be rioted that the determination method in S502 is not limited to only the above method.

In a case where the pattern of the access based on the access request newly received from the host 2 in the processing of S501 corresponds to a sequential access (S502, Yes), the data control unit 111 transmits a translation request and a notification of a sequential access to the address control unit 112 (S503). In the address control unit 112 having received them, the processing unit 113 translates the logical address requested in the translation request into the physical address on the basis of the translation information group 131 (S504), and responds the physical address obtained by the translation to the data control unit 111 (S505). In a case where the logical address requested in the translation request is unrecovered, the address control unit 112 executes the on-demand recovery, and thereafter executes the processing of S504. The data control unit 111 access the location indicated by the physical address included in the response from the address control unit 112 (S506).

Further, the processing unit 113 identifies the partial space to which the logical address requested in the translation request belongs (S507). The processing unit 113 determines whether the partial space following the identified partial space on the logical address space (hereinafter following partial space) is unrecovered or not (S508). In a case where the following partial space is unrecovered (S508, yes), the address control unit 112 sets the following partial space as the recovery target (S509). Then, with regard to the recovery target partial space, the same processing as the processing of S303 to S305 of FIG. 11 is executed in S510 to S512, and the operation is terminated. The following partial space is not unrecovered (S508, no), the operation is terminated.

In a case where the pattern of the access based on the access request newly received from the host 2 in the processing of S501 does not correspond to a sequential access (S502, No), the data control unit 111 transmits a translation request to the address control unit 112 (S513). Then, the same processing as the processing of S504 to S506 is executed in S514 to S516, and the operation is terminated.

As described above, according to the fourth embodiment, in a case where the memory controller 10 receives an access request based on the access pattern of the sequential access and the partial space following, on the logical address space, the partial space to which the translation information 1311 of the usage target belongs is unrecovered, the memory controller 10 starts the recovery of the following partial space. The following partial space can be recovered in advance, and therefore, in a case where the sequential access is continued after the use of all the translation information 1311 belonging to the partial space to which the translation information 1311 of the usage target belongs, a response to the access request can be returned in a shorter time.

Fifth Embodiment

According to the fifth embodiment, the second recording unit 115 stores a memory image of the location information group 132 to the corresponding log area 203 in units of partial spaces. More specifically, the second recording unit 115 divides the location information group 132 for every partial space. The second recording unit 115 non-volatilizes each of the divided location information group 132 into NAND memory 20. The memory image of the location information group 132 in units of partial spaces will be denoted as a snapshot. The snapshot may be stored in an area other than the log areas 203. Here, it will be explained that the snapshot is stored in each of the log areas 203. The second recording unit 115 stores the snapshot of the same partial space to the corresponding log area 203 a plurality of times. For example, the second recording unit 115 counts the number of times the log 204 is stored for every partial space. When the count value of any given partial space attains a predetermined value, the second recording unit 115 stores the snapshot of the partial space to the corresponding log area 203, and resets the count value. As described above, the second recording unit 115 stores the snapshot to the log area 203, so that the first recovery unit 116 can recover the partial space on the basis of only the snapshot and the log area 203 stored in the log area 203 after the snapshot.

Figure 14:
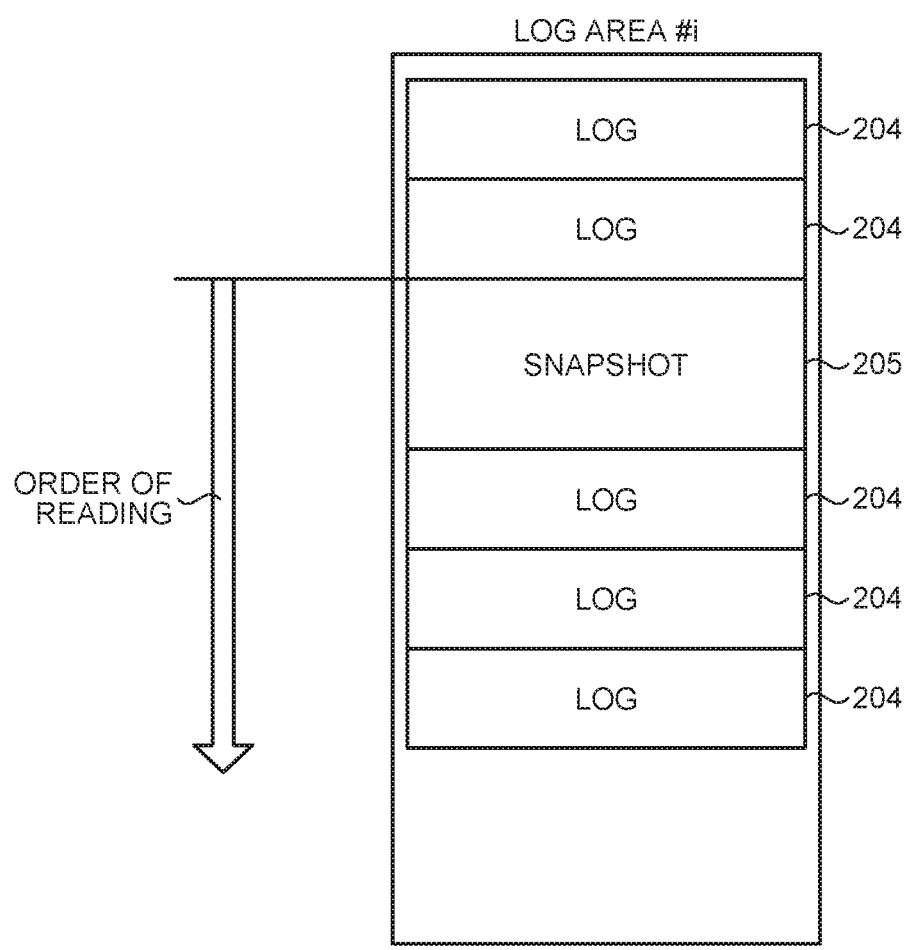
FIG. 14 is a figure for explaining a method of recovery of a partial space according to a fifth embodiment.

FIG. 14 is a figure for explaining a method of the fifth embodiment of the recovery of a partial space. First, the first recovery unit 116 reads the snapshot 205 from the log area 203, and writes the read snapshot 205 to the location information group 132 in an overwriting manner. In a case where the log area 203 stores a plurality of snapshots 205, the first recovery unit 116 reads one of the plurality of snapshots 205 that is lastly stored. Subsequently, the first recovery unit 116 reads, in the order in which the logs 204 are stored, all the logs 204 stored after the read snapshot 205, writes the physical address recorded to each of the read logs 204 in an overwriting manner to the location information group 132 for every logical address.

As described above, according to the fifth embodiment, the partial space can be recovered on the basis of only the snapshot 205 and the log area 204 stored in the log area 203 after the snapshot 205, and therefore, the amount of logs read from the log area 203 can be reduced. In a case where the first recovery unit 116 is configured to read each of all the logs 204 stored in each of the log areas 204 in the same order as the order in which the logs 204 are stored, the amount of the location information 1321 overwritten to the location information group 132 can be reduced.

Sixth Embodiment

In the explanation of the first to the fifth embodiments, each piece of the translation information 1311 is considered to be arranged in the order of the logical addresses which correspond to the physical addresses where the corresponding user data 201 are written. An order of arrangement of each piece of the translation information 1311 is not limited as the order described above. For example, a buffer is allocated in the RAM 13, and then each piece of the translation information 1311 is input, or output to/from the buffer in accordance with a predetermined rule (for example, FIFO and so on).

In addition, in the explanation of the first to the fifth embodiments, the user data 201, all of the translation information 202, and the logs 204, 204a is stored in the NAND memory 20. The memory systems 1, 1a may include a plurality of non-volatile memories including the NAND memory 20, and each of the user data 201 and the translation information 202 may be stored into the non-volatile memory different respectively. Each of the user data 201 and the logs 204, 204a may be stored into a non-volatile memory different respectively.

In addition, in the explanation of the first to the fifth embodiments, all of the translation information group 131 and the location information group 132 is considered to be stored in the RAM 13. The RAM 13 may be composed of a plurality of RAMS (for example, DRAM and SRAM), and each of the translation information group 131 and the location information group 132 may be stored in a RAM different respectively. For example, the translation information group 131 may be stored to the DRAM and the location information group 132 may be stored in the SRAM.

Seventh Embodiment

Figure 15:
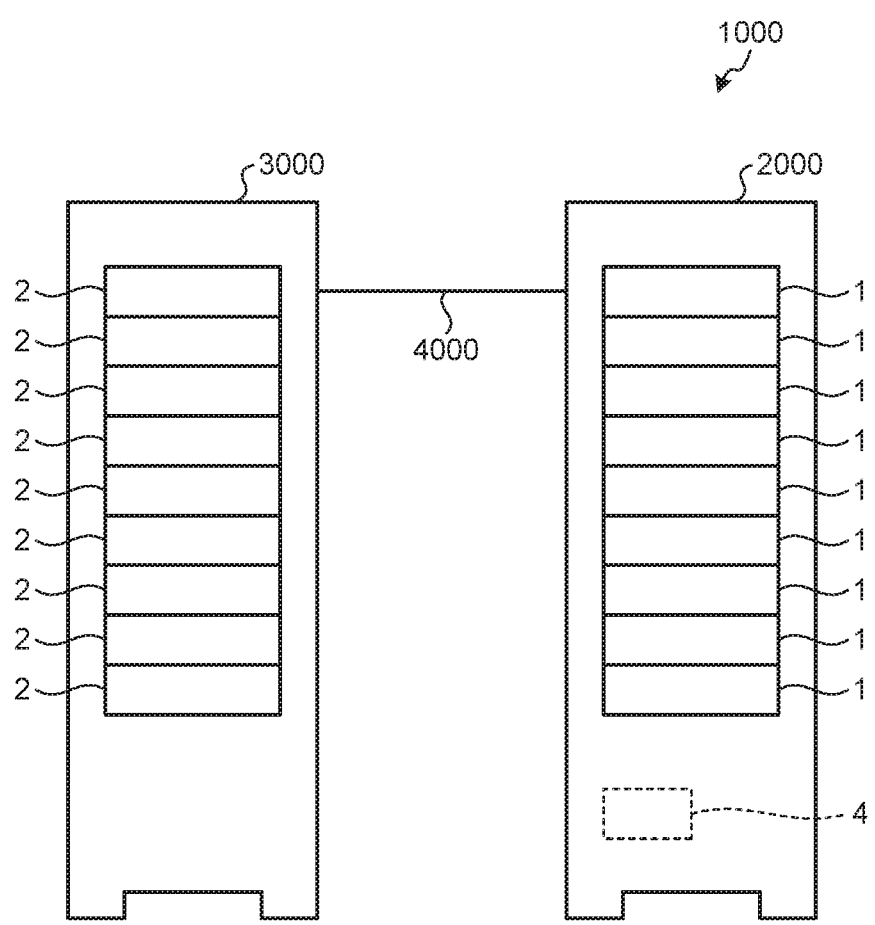
FIG. 15 is a figure illustrating an example of an implementation of a memory system according to a sixth embodiment.

FIG. 15 is a figure illustrating an example of an implementation of a memory system 1. The memory system 1 is implemented on, for example, a server system 1000. The server system 1000 is configured by connecting a disk array 2000 and a rack mount server 3000 via a communication interface 4000. Any given standard may be employed as the standard of the communication interface 4000. The rack mount server 3000 includes a server rack, and is configured such that one or more hosts 2 are mounted on the server rack. Each host 2 can access the disk array 2000 via the communication interface 4000.

The disk array 2000 includes a server rack, and one or more memory systems 1 are mounted on the server rack. In the disk array 2000, not only the memory system 1 but also one or more hard disk units may be mounted. Each memory system 1 can execute a command from each host 2. In addition, the disk array 2000 may include a power source 4 therein. Each memory system 1 is operated by using the electric power provided from the power source 4. Each memory system 1 has a configuration employing the first to sixth embodiments. Therefore, each memory system 1 can process an access request as soon as possible after returning from the power supply interruption. The disk array 2000 can return a response to the access request in a shorter time as compared with the case where each memory system 1 continuously recovers all the location information 1321 belonging to the location information group 132.

While certain embodiments have been described, these embodiments have been presented by way of example only, and are not intended to limit the scope of the inventions. Indeed, the novel embodiments described, herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a first memory being a nonvolatile memory and storing translation information, the translation information associating a logical address and a physical address, the logical address indicating a location in an address space provided to the host, the physical address indicating a location in the first memory;
   a second memory being a volatile memory and storing location information, the location information associating the logical address and a location where the translation information is stored in the first memory; and
   a controller that updates the translation information and the location information,
   wherein after returning from a power supply interruption, in a case where first location information has not yet been recovered when receiving an access request regarding a first logical address, the controller starts recovery of the first location information and, after the recovery of the first location information is completed, the controller starts executing processing according to the access request by using the first location information and first translation information, the first location information being a part of the location information and associating the first logical address and a storage location of the first translation information, the first translation information associating the first logical address and a physical address; and in a case where, after executing the processing according to the access request, second location information has not yet been recovered and the controller attempts to use second translation information, the controller starts recovery of the second location information, the second location information being a part of the location information different from the first location information and associating a second logical address and a storage location of the second translation information, the second translation information associating the second logical address and a physical address.

2. The memory system according to claim 1, wherein the first logical address is included in a first address space which is a part of the address space, the second logical address is included in a second address space which is a part of the address space and different from the first address space.

3. The memory system according to claim 1, wherein the first memory comprises a first log area and a second log area, the controller stores one or more first logs into the first log area, the first log being a difference occurred in an update of the first location information, stores one or more second logs into the second log area, the second log being a difference occurred in an update of the second location information, recovers the first location information on the basis of the one or more first logs, and recovers the second location information on the basis of the one or more second logs.

4. The memory system according to claim 1, wherein the location information is divided into a plurality of pieces of third location information including the first location information and the second location information, and the controller selects a single piece of unrecovered third location information among the plurality of pieces of third location information with timing according to an elapsed time, and starts recovery of the selected single piece of third location information.

5. The memory system according to claim 1, wherein the location information is divided into a plurality of pieces of third location information including the first location information and the second location information, and in an idle state, the controller selects a single piece of unrecovered third location information among the plurality of pieces of third location information, and starts recovery of the selected single piece of third location information.

6. The memory system according to claim 2, wherein the location information is divided into a plurality of pieces of third location information including the first location information and the second location information, the address space is divided into a plurality of third address spaces including the first address space and the second address space, in respective pieces of third location information, a logical address included in a respectively different third address space and a physical address are associated, and the controller selects, in an order of corresponding logical addresses, a single piece of unrecovered third location information among the plurality of pieces of third location information, and starts recovery of the selected single piece of third location information.

7. The memory system according to claim 2, wherein in a case where the second location information is unrecovered and the controller receives, from the host, a recovery request including designation of the second address space or the second logical address, the controller starts the recovery of the second location information.

8. The memory system according to claim 2, wherein the second address space follows the first address space, and the controller starts the recovery of the second location information, if a condition is satisfied, the condition comprising:
1) the memory system has been accessed in accordance with an access pattern of a sequential access;
2) the controller has used the first translation information; and
3) the second location information is unrecovered.

9. The memory system according to claim 1, wherein the controller stores a snapshot which is a copy of the first location information, into the first memory for one or more times, stores a plurality of logs into the first memory in an order corresponding to update timing of the first location information, the log being a difference occurred in an update of the first location information, and recovers the first location information on the basis of a snapshot stored lastly into the first memory and a log stored into the first memory after the snapshot stored lastly into the first memory.

10. The memory system according to claim 1, wherein the controller stores a plurality of logs into the first memory in an order corresponding to update timing of the first location information, the log being a difference occurred in an update of the first location information, reads contents of the plurality of logs in the order corresponding to the update timing of the first location information, and stores the read contents of the plurality of logs into the second memory in an overwriting manner for each logical address.

11. The memory system according to claim 1, wherein the controller stores a plurality of logs into the first memory in an order corresponding to update timing of the first location information, the log being a difference occurred in an update of the first location information, reads contents of the plurality of logs in an order opposite to the order corresponding to the update timing of the first location information, and stores the read contents of the plurality of logs into the second memory for each logical address, and in a case where two contents are read with regard to the same logical address, the controller does not store the content that is read later of the two contents, into the second memory.

12. The memory system according to claim 1 further comprising a third memory capable of operating at a higher speed than the second memory, wherein the controller reads contents of a plurality of logs in an order corresponding to update timing of the first location information, the log being a difference occurred in an update of the first location information, generates the first location information in the third memory by writing the read contents of the plurality of logs into the third memory in an overwriting manner for each logical address, and transfers the first location information generated in the third memory to the second memory.

13. The memory system according to claim 1 further comprising a third memory capable of operating at a higher speed than the second memory, wherein the controller reads contents of a plurality of logs in an order opposite to an order corresponding to update timing of the first location information, the log being a difference occurred in an update of the first location information, writes the read contents of the plurality of logs into the third memory for each logical address, and in a case where two contents are read with regard to the same logical address, the controller does not store the content that is read later of the two contents, into the second memory, thus generating the first location information in the third memory, and the controller transfers the first location information generated in the third memory to the second memory.

14. The memory system according to claim 1, wherein after returning from a power supply interruption and after recovery of the first location information, the controller reads some or all of the first translation information from the first memory to the second memory on the basis of the recovered first location information, uses the first translation information that is read to the second memory, the first translation information associating the first logical address and a physical address, the first location information associating the first logical address and a storage location of the first translation information, and the first logical address being included in a first address space which is a part of the address space.

15. The memory system according to claim 14, wherein the controller updates the first translation information read to the second memory, and thereafter, writes the updated first translation information into the first memory, and updates the first location information in response to writing of the updated first translation information into the first memory.

16. The memory system according to claim 15, wherein the controller collectively writes a plurality of pieces of updated first translation information into an area where physical addresses are continuous in the first memory, and the controller collectively writes a head location where the plurality of pieces of updated first translation information is stored and logical addresses respectively related to the plurality of pieces of the updated first translation information into an area where physical addresses are continuous in the first memory.

17. The memory system according to claim 1, wherein after the recovery of the first location information is completed, the controller further starts executing receiving another access request from the host and processing in response to the another access request.

18. The memory system according to claim 1, wherein the access request regarding the first logical address comprises access request from the host and access request of internal processing of the memory system.

* * * * *